United States Patent
Tang et al.

(10) Patent No.: US 11,562,445 B2
(45) Date of Patent: Jan. 24, 2023

(54) METHOD FOR PROGRAMMING ENERGY STORAGE DEVICES IN POWER-GAS COUPLING SYSTEM BASED ON RELIABILITY CONSTRAINTS

(71) Applicant: Guizhou Power Grid Company Limited, Guiyang (CN)

(72) Inventors: Xueyong Tang, Guiyang (CN); Minglei Bao, Guiyang (CN); Zhenming Liu, Guiyang (CN); Yongyuan Luo, Guiyang (CN); Qingsheng Li, Guiyang (CN); Yi Ding, Guiyang (CN); Bin Sun, Guiyang (CN); Peng Wu, Guiyang (CN); Xia Yan, Guiyang (CN); Sheng Wang, Guiyang (CN); Xianggang He, Guiyang (CN); Ning Luo, Guiyang (CN); Jindi Hu, Guiyang (CN); Xiaocong Sun, Guiyang (CN)

(73) Assignee: Guizhou Power Grid Company Limited, Guiyang (CN)

(*) Notice: Subject to any disclaimer, the term of this patent is extended or adjusted under 35 U.S.C. 154(b) by 53 days.

(21) Appl. No.: 17/165,957

(22) Filed: Feb. 3, 2021

(65) Prior Publication Data
US 2022/0122198 A1 Apr. 21, 2022

(30) Foreign Application Priority Data
Oct. 19, 2020 (CN) .......................... 202011115587.2

(51) Int. Cl.
*G06Q 50/06* (2012.01)
*G05B 15/02* (2006.01)

(52) U.S. Cl.
CPC ............. *G06Q 50/06* (2013.01); *G05B 15/02* (2013.01)

(58) Field of Classification Search
None
See application file for complete search history.

(56) References Cited

U.S. PATENT DOCUMENTS

| 8,768,810 B2* | 7/2014 | Infanger | G06Q 40/04 705/36 R |
| 9,043,163 B2* | 5/2015 | Mezic | G05B 15/02 702/24 |
| 11,249,121 B2* | 2/2022 | Wong | G01R 21/133 |

OTHER PUBLICATIONS

Dantzig et al.; "Large-Scale Stochastic Linear Programs: Importance Sampling and Benders Decomposition"; 1991; Stanford University; pp. 1-11. (Year: 1991).*

(Continued)

*Primary Examiner* — Umut Onat
(74) *Attorney, Agent, or Firm* — Idea Intellectual Limited; Margaret A. Burke; Sam T. Yip

(57) ABSTRACT

A method for programming the energy storage device in power-gas coupling system based on reliability constraints is provided. The method includes: obtain the parameters and operation condition of each equipment of the power-gas coupling system in a year; determine the different operating states of the system. A programming model of the energy storage device based on reliability constraints is constructed based on the operating state of the system, and benders decomposition algorithm is adopted to calculate the programming model, so that the programming scheme of the energy storage device is obtained. Considering not only the economy but also the reliability of the system, which is more accurate, comprehensive and effective than the previous programming method; the present invention is of great significance to improve the reliability of the electric power system and ensure the safe and reliable operation of the electric power system.

9 Claims, 3 Drawing Sheets

(56) References Cited

OTHER PUBLICATIONS

Infanger; "Monte Carlo (Importance) Sampling within a Benders Decomposition Algorithm for Stochastic Linear Programs"; 1992; Stanford University; Annals of Operations Research; pp. 69-95. (Year: 1992).*

* cited by examiner

METHOD FOR PROGRAMMING ENERGY STORAGE DEVICES IN POWER-GAS COUPLING SYSTEM BASED ON RELIABILITY CONSTRAINTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to Chinese patent application No. 2020111155872 filed on Oct. 19, 2020, and the disclosure of which is incorporated herein by reference in its entirety.

FIELD OF THE INVENTION

The present invention relates to the technical field of reliability management of integrated energy system, in particular to a method for programming the energy storage device in power-gas coupling system based on reliability constraints.

BACKGROUND OF THE INVENTION

In recent years, with the advantages of flexibility and efficiency, natural gas units are widely used, which make the coupling between natural gas system and electric power system closer, together constituting the power-gas coupling system. In this context, natural gas units can only produce electric energy by obtaining natural gas from the natural gas system to meet the demand of power load in the electric power system. Therefore, the failure of natural gas system may affect the operation of electric power system and threaten the safe and stable operation of electric power system; in order to ensure the reliability of the power-gas coupling system, the unified programming of the energy storage devices in the electric power system and the natural gas system is necessary; the coupling characteristics of the two systems are fully considered, to ensure sufficient capacity in the system.

SUMMARY OF THE INVENTION

The present invention is to solve the technical problem that: effectively ensure the reliability and the sufficient long-term reserve capacity of the power-gas coupling system. The present invention is proposed in view of the above possible problems.

The present invention has the following beneficial effects that: considering not only the economy but also the reliability of the system in the programming process, the present invention determines more effectively and accurately the programming scheme of the energy storage device in power-gas coupling system, which is more accurate, comprehensive and effective than the previous programming method; In addition, the present invention can be directly applied in the power programming software at current stage, to accurately and efficiently programme the energy storage device in the power-gas coupling system through the study of the influence of natural gas system failure on electric power system, which is of great significance to improve the reliability of the electric power system and ensure the safe and reliable operation of the electric power system.

DETAILED DESCRIPTION

Embodiment 1

Figure 1:
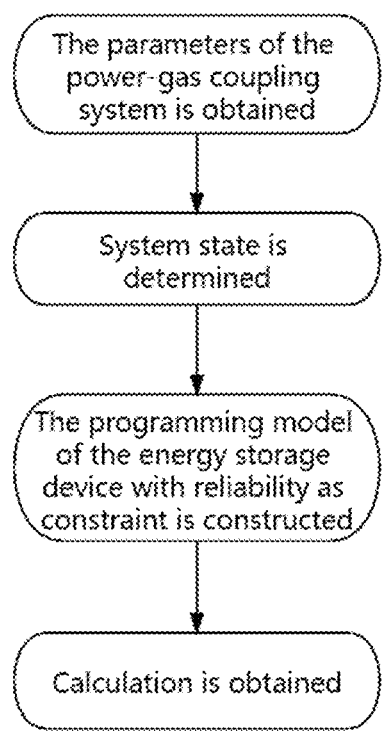
FIG. 1 depicts a basic flow chart of an embodiment of the present invention—a method for programming the energy storage device in power-gas coupling system based on reliability constraints.
Figure 2:
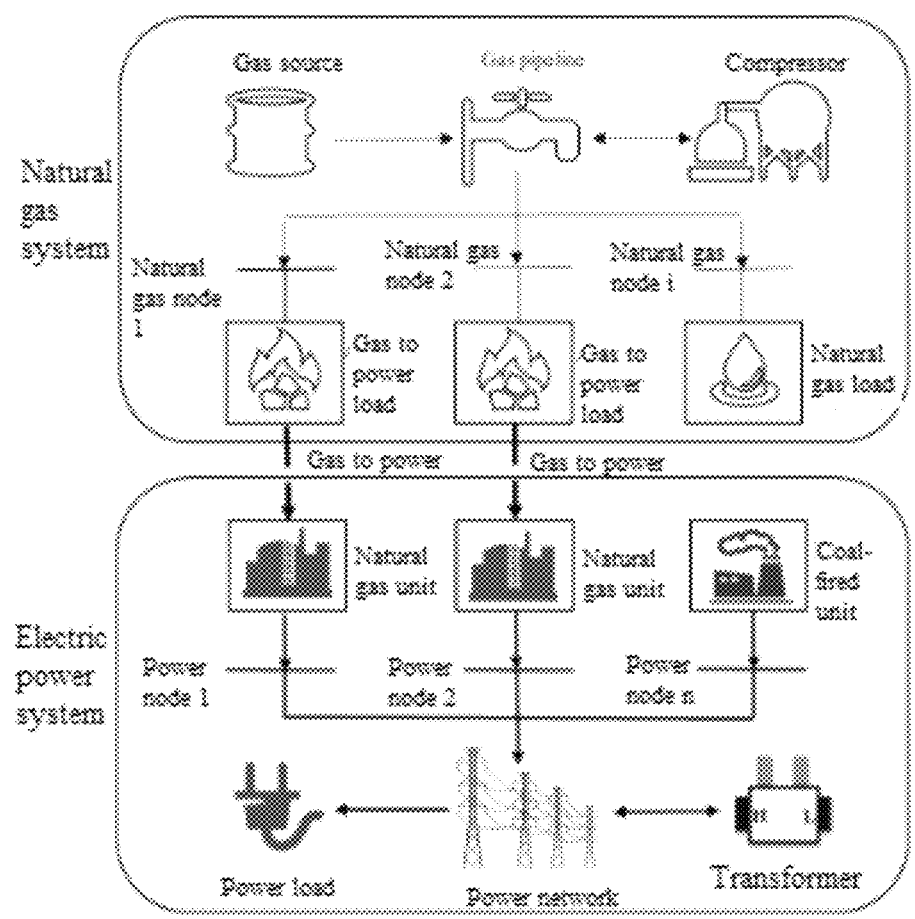
FIG. 2 depicts a schematic diagram of a power-gas coupling system in an embodiment of the present invention—a method for programming the energy storage device in power-gas coupling system based on reliability constraints.
Figure 3:
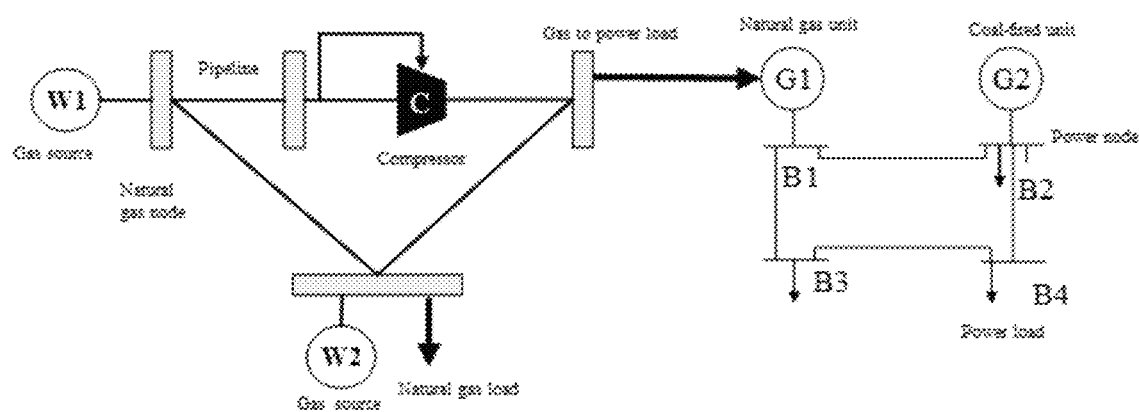
FIG. 3 depicts a system diagram of testing a power-gas coupling system in an embodiment of the present invention—a method for programming the energy storage device in power-gas coupling system based on reliability constraints.

As shown in FIGS. 1-3, as an embodiment of the present invention, provides a method for programming the energy storage device in power-gas coupling system based on reliability constraints, comprising:

Monitoring equipment is used to get the parameters and operation condition of each equipment in the power-gas coupling system in a year and input the parameters and operation condition in the programming model. Monitoring equipment includes pressure sensor, flow sensor, voltage sensor, current sensor.

Based on the input information, the Monte Carlo sampling strategy is used to determine the different operating states of the system according to the reliability parameters of the components in the system and the fault and repair of the components.

It should be noted that the different operating states of the system comprise, $$O_t = [O_{t1}, L, O_{tb}, L, O_{tN_b}],$$

where, $O_t$ refers to the state matrix of the system of year t, $O_{tb}$ refers to the vector of the system under state b of year t, and $N_b$ refers to the total number of states of the system.

The Monte Carlo sampling strategy is to determine the operating state of components by sampling method according to the failure rate and repair rate of components.

Specifically, the operating state of the system and the random failures of the components in the system are determined based on component faults. Firstly, the operating states of different components are obtained through Monte Carlo sampling. The different states of the system can be expressed as:

$$O_t = [O_{t1}, L, O_{tb}, L, O_{tN_b}],$$

where, $O_t$ refers to the state matrix of the system of year t, $O_{tb}$ refers to the vector of the system under state b of year t, and $N_b$ refers to the total number of states of the system.

Where, the state vector $O_{tb}$ of system refers to the collection of states of all components of the system.

Taking the electric power system as an example, $O_{tb}$ can be expressed as:

$$O_{tb}=[O_{1tb}, L, O_{ktb}],$$

where, $O_{ktb}$ refers to the running state of the generator set k under state b of year t.

Corresponding duration for different states b can be expressed as:

$$D=[D_{t1}, L, D_{tb}, L, D_{tN_b}],$$

where, D refers to the collection of duration of each state, $D_{tb}$ refers to the duration under state b of year t.

A programming model of the energy storage device based on reliability constraints is constructed based on the operating state of the system; benders decomposition algorithm is adopted to calculate the programming model, so that the programming scheme of the energy storage device is obtained.

Wherein, the programming model of the energy storage device comprises the establishment of objective functions and constraint conditions.

Specifically, the objective functions comprise, $$\min TC = IC + OC + \sum_t \frac{EENS_t \cdot C_t^E + EGNS_t \cdot C_t^G}{(1+d)^{t-1}},$$

where, TC refers to the total variables programmed for the system, IC refers to the variables programmed for energy storage device, OC refers to the variables of power-gas coupling system in operation, $EENS_t$ and $EGNS_t$ refer to the average power load loss and average gas load loss of year t respectively, $C_t^E$ and $C_t^G$ refer to the variables of power load loss and gas load loss of year t respectively, d refers to discount rate.

More specifically, the power-gas coupling system is mainly composed of the natural gas system and the electric power system coupled by the natural gas unit; natural gas unit produces electricity by consuming natural gas; the input end of natural gas unit is connected to the natural gas system as the natural gas load, while the output end is connected to the electric power system as the generator set; the natural gas system is mainly composed of compressor, pipeline, gas source and natural gas load; each natural gas node comprises gas source and natural gas load, and the natural gas nodes are connected with each other through pipelines; the electric power system is mainly composed of coal-fired units, natural gas units, lines and power loads; each power node comprises coal-fired units, natural gas units and power loads, and the power nodes are connected with each other through lines.

Secondly, the constraint conditions comprise the constraint for energy storage device programming, natural gas system, electric power system and reliability.

Wherein, the reliability standards comprise average power load loss and average gas load loss.

Specifically, the average power load loss comprises, $$EENS_t = \sum_i \sum_b PLC_{itb} \cdot D_{tb},$$

where, $EENS_t$ refers to the average power load loss of year t; i refers to the index of power node; $PLC_{itb}$ refers to the power load loss at power node i under state b of year t; and $D_{tb}$ refers to the duration under state b.

The average gas load loss comprises, $$EGNS_t = \sum_m \sum_b GLC_{mtb} \cdot D_{tb},$$

where, $EGNS_t$ refers to the average gas load loss of year t.

Further, the constraints for the energy storage device programming comprise, $$z_{e(t-1)} \leq z_{et} \ \forall e \in CS, \forall t;$$

$$z_{g(t-1)} \leq z_{gt} \ \forall g \in CG, \forall t,$$

where, $z_{et}$ and $z_{gt}$ refer to the programmed state of battery t and gas storage device of year e respectively, wherein CS and CG refer to a collection of batteries and a collection of gas storage devices respectively.

Secondly, the constraints for natural gas system and electric power system comprise, constraints for natural gas system: constraints for gas flow balance at node, pipeline flow, compressor, gas source output, gas storage unit output, natural gas load loss;

constraints for electric power system: constraints for power balance at node, line power, nodal angle, battery output power, generator set output power, power load loss.

The process of benders decomposition algorithm solution model comprises decomposing the energy storage device programming model into one programming master problem and adding two reliability problems for quick solution.

More specifically, A and B, in the above formula, can be calculated respectively by the following formula:

$$IC = \sum_t \sum_{e \in CS} \frac{1}{(1+d)^{t-1}} P_{et}^{max}(z_{et} - z_{e(t-1)}) +$$

$$\sum_t \sum_{g \in CG} \frac{1}{(1+d)^{t-1}} W_{gt}^{max}(z_{gt} - z_{g(t-1)});$$

$$OC = \sum_t \sum_b \frac{1}{(1+d)^{t-1}} \cdot \left( \sum_{k \in EG} C_k \cdot P_{ktb} + \sum_{e \in CS} C_e \cdot P_{etb} \right) \cdot D_{tb} +$$

$$\sum_t \sum_b \frac{1}{(1+d)^{t-1}} \cdot \left( \sum_{w \in EW} C_w \cdot W_{wtb} + \sum_{g \in CG} C_g \cdot W_{gtb} \right) \cdot D_{tb},$$

where, $P_{et}^{max}$ and $W_{gt}^{max}$ refer to the capacity of battery e and gas storage device W of year t respectively; $z_{et}$ and $z_{gt}$ refer to the programmed state of battery e and gas storage device g of year t respectively; CS and CG refer to the collection of batteries and gas storage devices respectively; $P_{ktb}$ and $C_k$ refer to the variable of the output capacity and corresponding supply capacity of coal-fired unit k under state b of year t respectively; $P_{etb}$ and $C_e$ refer to the variable of the output capacity and corresponding supply capacity of battery e under state b of year t respectively; $W_{wtb}$ and $C_w$ refer to the variable of the output capacity and corresponding supply capacity of gas source w under state b of year t respectively; $W_{gtb}$ and $C_g$ refer to the variable of the gas output and corresponding supply capacity of gas storage device g under state b of year t respectively; $D_{tb}$ refers to the duration under state b of year t; EG and EW refer to the collection core-fired unit k and gas source w.

The following constraints are established simultaneously:

I. Programming Constraints for Energy Storage Device:

During the programming process, the programming state of the energy storage device must satisfy the following constraints:

$$z_{e(t-1)} \leq z_{et} \ \forall e \in CS, \forall t;$$

$$z_{g(t-1)} \leq z_{gt} \ \forall g \in CG, \forall t,$$

In addition, the generation capacity and air source capacity in the system of each year t after the energy storage device is programmed shall be larger than the load, which meets the following constraints:

$$\sum_i \sum_{e \in CS} P_{iet}^{max} \cdot z_{et} + \sum_{k \in EG} P_{ik}^{max} \geq PD_{tb} + PR_{tb} \ \forall \ b, \forall \ t;$$

$$\sum_m \sum_{g \in CG} W_{mgt}^{max} \cdot z_{gt} + \sum_{w \in EW} W_{mw}^{max} \geq GD_{tb} + GR_{tb} \ \forall \ b, \forall \ t,$$

where, $P_{iet}^{max}$ refers to the capacity of battery e at power node i; $P_{ik}^{max}$ refers to the generating capacity of generator set k at power node i; $W_{mgt}^{max}$ refers to the capacity of gas storage device g at natural gas node m; $W_{mw}^{max}$ refers to the gas production capacity of gas source W at natural gas node m; $PD_{tb}$ and $GD_{tb}$ refer to the power load and the natural gas load under state b of year t respectively; $PR_{tb}$ and $GR_{tb}$ refer to the power reserve capacity and the natural gas reserve capacity under state b of year t respectively.

II. Constraints for Natural Gas System:

During operation, the natural gas system needs to meet the following constraints, specifically as follows:

a. Constraints for Gas Flow Balance at Node:

In the system operation, the natural gas inflow and outflow at any node is the same, specifically expressed as:

$$\sum_{w \in EW} W_{mwtb} + \sum_{g \in CG} W_{mgtb} - \sum_{p \in GL} \tau_{ptb} - \sum_{c \in GC} \tau_{ctb} = GD_{mtb} - GLC_{mtb} \forall m,$$

$$\forall b, \forall t,$$

where, $W_{mwtb}$ refers to the gas output of gas source w at natural gas node m under state b of year t; $W_{mwtb}$ refers to the gas output of gas storage device g at natural gas node m under state b of year t; $\tau_{ptb}$ refers to the amount of natural gas flowing through pipeline p under state b of year t; $\tau_{ctb}$ refers to the amount of natural gas flowing through compressor C under state b of year t; $GD_{mtb}$ refers to the natural gas load at node m under state b of year t; $GLC_{mtb}$ refers to the natural gas load loss at node m under state b of year t; GC and GL refer to the collection of compressor and pipeline respectively.

b. Constraints for Pipeline Flow:

The amount of natural gas flowing through the pipeline is related to the air pressure at both ends, specifically expressed as:

$$(\sigma_{ptb}^+ - \sigma_{ptb}^-) \cdot (\pi_{mtb} - \pi_{ntb}) = \tau_{ptb}^2 / M_p \ \forall p \in GL, \forall b, \forall t,$$

where, $\sigma_{ptb}^+$ and $\sigma_{ptb}^-$ refer to the marker for the flow direction of natural gas in pipeline p; $\sigma_{ptb}^+=1$ means that the natural gas in pipeline p flows from node m to node n; $\sigma_{ptb}^-=1$ means that the natural gas in pipeline flows from node n to node m; $\pi_{mtb}$ and $\pi_{ntb}$ refer to the gas pressure at node m and n under state b of year t respectively; $M_p$ refers to the fixed parameters of pipeline p.

The positions of markers for pipeline flow are binary variables and meet the following constraints:

$$\sigma_{ptb}^+ + \sigma_{ptb}^- = 1 \ \forall p \in GL, \forall b, \forall t.$$

In addition, the pipeline flow needs to meet the following constraints:

$$-(1-\sigma_{ptb}^+) \cdot \tau_p^{max} \leq \tau_{ptb} \leq (1-\sigma_{ptb}^-) \cdot \tau_p^{max} \ \forall p \in GL, \forall b, \forall t,$$

where, $\tau_p^{max}$ refers to the maximum natural gas flow in pipeline p.

c. Constraints for Compressor:

The air pressure at both ends of the compressor is related to the coefficient of compressor, specifically expressed as:

$$\Gamma_{ctb} = \pi_{cmtb} / \pi_{cntb} \ \forall c \in GC, \forall m, \forall b, \forall t,$$

where, $\Gamma_{ctb}$ refers to the compressibility of compressor C under state b of year t; $\pi_{cmtb}$ and $\pi_{cntb}$ refer to the air pressure at node m and node n of compressor c under state b of year t respectively.

In addition, the compressibility of compressor shall meet the following constraints:

$$\Gamma_c^{min} \leq \Gamma_{ctb} \leq \Gamma_c^{max} \ \forall c \in GC, \forall m, \forall b, \forall t,$$

where, $r_c^{max}$ and $r_c^{min}$ refers to the maximum and minimum compressibility of compressor C respectively.

d. Constraints for the Output Capacity of Air Source:

The output capacity of air source shall meet the following constraints:

$$0 \leq W_{mwtb} \leq W_{mv}^{max} \cdot o_{wtb} \ \forall w \in EW, \forall m, \forall b, \forall t,$$

where, $W_{mw}^{max}$ refers to the maximum output capacity of air source W at node m; $o_{wtb}$ refers to the running state of air source w under state b of year t.

e. Constraints for the Output of Gas Storage Device:

Gas storage device shall meet the following constraints:

$$-W_{mg}^{max} \cdot z_{gt} \leq W_{mgtb} \leq W_{mg}^{max} \cdot z_{gt} \ \forall g \in CG, \forall m, \forall b, \forall t,$$

where, $W_{mg}^{max}$ refers to the maximum output of gas storage device g at node m.

f. Constraints for Natural Gas Load Loss:

The natural gas load loss at each node shall meet the following constraints:

$$GLC_{mtb} \leq GD_{mtb} \ \forall m, \forall b, \forall t.$$

III. Constraints for Electric Power System:

During operation, the electric power shall meet the following constraints, specifically as follows:

a. Constraints for Power Balance at Node:

At any power node, the power inflow is equal to the outflow, which is specifically expressed as:

$$\sum_{e \in CS} P_{ietb} + \sum_{k \in EG} (P_{iktb}^{GG} + P_{iktb}^{CG}) - (PD_{itb} - PLC_{itb}) = \sum_{l \in EL} f_{ltb} \ \forall \ i, \forall \ b, \forall \ t,$$

where, $P_{ietb}$ refers to the output power of battery e at power node i under state b of year t; $P_{iktb}^{GG}$ refers to the output power of natural gas unit k at power node i under state b of year t; $P_{iktb}^{CG}$ refers to the output power of coal-fired unit k at power node i under state b of year t; $PLC_{itb}$ refers to the power load loss at power node i under state b of year t; $f_{ltb}$ refers to the power of line l under state b of year t; EL refers to the collection of power line.

b. Constraints for Line Power:

The power flowing through the power line shall meet the following constraints:

$$f_{ltb} \leq (\theta_{itb} - \theta_{jtb}) / x_l \ \forall l \in EL, \forall b, \forall t,$$

where, $\theta_{itb}$ and $\theta_{jtb}$ refer to the directional angle of power node i and node j under state b of year t; $x_l$ refers to the impedance of line l.

In addition, the power flowing through the power line shall meet the following constraints:

$$-f_l^{max} \leq f_{ltb} \leq f_l^{max} \quad \forall l \in EL, \forall b, \forall t,$$

where, $f_l^{max}$ refers to the power transmission capacity of line l.

c. Constraints for the Directional Angle of Node:
The directional angle of node shall meet the following constraints:

$$-\theta_i^{max} \leq \theta_{itb} \leq \theta_i^{max} \quad \forall i, \forall b, \forall t,$$

where, $\theta_i^{max}$ refers to the maximum value of the directional angle of node i.

d. Constraints for Battery Output Power:
The output power of battery shall meet the following constraints:

$$-P_{ie}^{max} \cdot z_e \leq P_{ietb} \leq P_{ie}^{max} \cdot o_{et} \quad \forall e \in CS, \forall i, \forall b, \forall t.$$

e. Constraints for Generator Set Output Power:
The output power of coal-fired unit shall meet the following constraints:

$$0 \leq P_{iktb}^{CG} \leq P_{ik}^{max} \cdot o_{ktb} \quad \forall k \in EG, \forall i, \forall b, \forall t,$$

where, $P_{ik}^{max}$ refers to the generating capacity of coal-fired unit at node i.

The output power of natural gas unit is related to the injected natural gas power, specifically expressed as:

$$P_{iktb}^{GG} = (GD_{mtb} - GLC_{mtb}) \cdot \vartheta \cdot o_{ktb} \quad \forall b, \forall t,$$

where, $\vartheta$ refers to the caloricity of natural gas.

f. Constraints for Power Load Loss:
The power load loss at each node shall meet the following constraints:

$$PLC_{itb} \leq PD_{itb} \quad \forall i, \forall b, \forall t.$$

IV. Constraints for Reliability:
The reliability of power-gas coupling system is usually measured by the average power load loss and the average natural gas load loss. The average power load loss can be calculated by the following formula:

$$EENS_t = \sum_i \sum_b PLC_{itb} \cdot D_{tb},$$

where, refers to the average power load loss of year. Average power load loss shall meet the following constraints:

$$EENS_t \leq EENS^{limit},$$

where, refers to the upper limit of average power load loss of year, which can be given by the programmer.

The average natural load loss can be calculated by the following formula:

$$EGNS_t = \sum_m \sum_b GLC_{mtb} \cdot D_{tb},$$

where, $EGNS_t$ refers to the average natural gas load loss of year t. Average natural gas load loss shall meet the following constraints:

$$EGNS_t \leq EGNS^{limit},$$

where, $EGNS^{limit}$ refers to the upper limit of average natural gas load loss of year t, which can be given by the programmer.

Embodiment 2

In order to verify and illustrate the technical effect adopted in this method, this embodiment compare the method for programming the energy storage device in power-gas coupling system in traditional technical solution with the present invention, so as to verify the real effect of this method.

Taking the power-gas coupling system as an example, we define the reliability constraints $EENS^{limit}$ and $EGNS^{limit}$ and are respectively 10000 MWh and $2 \times 10^5$ m$^3$. The model proposed by the present invention and the model of the traditional method are used to programme the system. Based on the programming results, the reliability analysis of the programmed system is carried out, and the analysis results are shown in the following table.

| | Reliability parameters of electric power system EENS | Reliability parameters of natural gas system EGNS |
|---|---|---|
| Traditional method | $8.5 \times 10^5$ m$^3$ | 95000 MWh |
| The method presented in the present invention | $1.3 \times 10^5$ m$^3$ | 9000 MWh |

As shown from the above analysis results, the reliability indexes EENS and EGNS obtained by the programming through traditional method are much higher than the reliability constraint indexes $EENS^{limit}$ and $EGNS^{limit}$, indicating that the programming results of the traditional method cannot guarantee the reliable operation of the system. On the contrary, the reliability indexes EENS and EGNS obtained by the present invention are far less than the reliability constraint indexes, indicating that the method proposed by the present invention can ensure the reliability requirements of the system.

What is claimed is:

1. A method for programming an energy storage device in a power-gas coupling system based on reliability constraints, the method comprising the steps below:
    obtaining, by a monitoring equipment, parameters and operation condition of each equipment of the power-gas coupling system in a year and inputting the parameters and the operation condition in a programming model;
    using, based on the parameters and the operation condition, a Monte Carlo sampling strategy to determine different running states of the power-gas coupling system according to reliability parameters of components in the power-gas coupling system and failure rate and repair rate of the components;
    constructing, based on an operating state of the power-gas coupling system, a programming model of the energy storage device based on reliability constraints;
    adopting benders decomposition algorithm to calculate the programming model of the energy storage device, so that a programming scheme of the energy storage device is obtained.

2. The method for programming the energy storage device in the power-gas coupling system based on the reliability constraints according to claim 1, wherein the programming model of the energy storage device comprises establishment of objective functions and constraint conditions.

3. The method for programming the energy storage device in the power-gas coupling system based on the reliability constraints according to claim 2, wherein the objective functions comprise:

$$\min TC = IC + OC + \sum_t \frac{EENS_t \cdot C_t^E + EGNS_t \cdot C_t^G}{(1+d)^{t-1}},$$

where, TC refers to the total variables programmed for the power-gas coupling system; IC refers to variables programmed for the energy storage device; OC refers to variables of the power-gas coupling system in operation, $EENS_t$ and $EGNS_t$ refer to an average power load loss and an average gas load loss of the year t respectively, $C_t^E$ and $C_t^G$ refer to variables of power load loss and gas load loss of the year t respectively, d refers to a discount rate.

4. The method for programming the energy storage device in the power-gas coupling system based on the reliability constraints according to claim 3, wherein the constraint conditions comprise a constraint for energy storage device programming, a natural gas system, an electric power system and reliability.

5. The method for programming the energy storage device in the power-gas coupling system based on the reliability constraints according to claim 4, wherein the reliability constraints comprise an average power load loss and an average gas load loss.

6. The method for programming the energy storage device in the power-gas coupling system based on the reliability constraints according to claim 5, wherein the average power load loss comprises:

$$EENS_t = \sum_i \sum_b PLC_{itb} \cdot D_{tb},$$

where, the $EENS_t$ refers to the average power load loss of the year t; i refers to an index of a power node; $PLC_{itb}$ refers to a power load loss at power node i under state b of year t; and $D_{tb}$ refers to a duration under state b of year t.

7. The method for programming the energy storage device in the power-gas coupling system based on the reliability constraints according to claim 6, wherein the average gas load loss comprises:

$$EGNS_t = \sum_m \sum_b GLC_{mtb} \cdot D_{tb},$$

where, the $EGNS_t$ refers to the average gas load loss of the year t; m refers to an index of a gas node; $GLC_{mtb}$ refers to a gas load loss at gas node m under state b of year t; and $D_{tb}$ refers to a duration under state b of year t.

8. The method for programming the energy storage device in the power-gas coupling system based on the reliability constraints according to claim 7, wherein the programming constraints for the energy storage device comprise:

$$z_{e(t-1)} \leq z_{et} \ \forall e \in CS, \forall t;$$

$$z_{g(t-1)} \leq z_{gt} \ \forall g \in CG, \forall t,$$

where, $z_{et}$ and $z_{gt}$ refer to a programmed state of battery e and gas storage device g of the year t respectively, wherein CS and CG refer to a collection of batteries and a collection of gas storage devices respectively.

9. The method for programming the energy storage device in the power-gas coupling system based on the reliability constraints according to claim 8, wherein
the constraints for the natural gas system comprise: constraints for gas flow balance at a node, a pipeline flow, a compressor, a gas source output, a gas storage unit output, and a natural gas load loss; and
the constraints for electric power system comprise: constraints for power balance at the node, a line power, a directional angle of the node, a battery output power, a generator set output power, and a power load loss.

* * * * *